Nov. 6, 1951  J. U. F. ANDERSEN  2,574,082
ROTO-VIBRATOR
Filed March 30, 1950
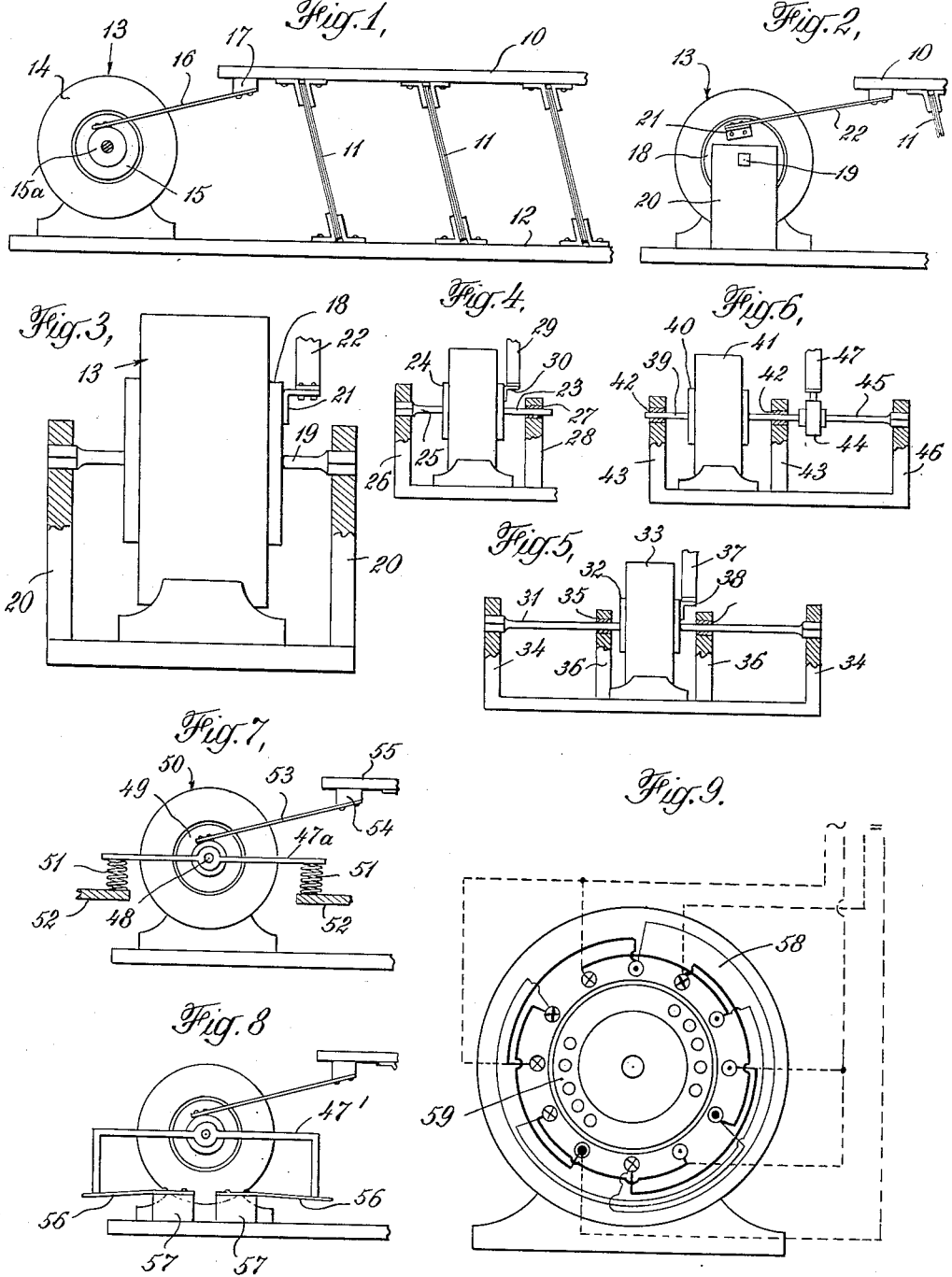
INVENTOR
Joakim Ulrik Frederik Andersen
BY
Pennie Edmonds Morton & Barrows
ATTORNEYS Patented Nov. 6, 1951

2,574,082

UNITED STATES PATENT OFFICE 2,574,082

ROTO-VIBRATOR

Joakim Ulrik Frederik Andersen, Copenhagen, Denmark, assignor to F. L. Smidth & Co., New York, N. Y., a corporation of New Jersey Application March 30, 1950, Serial No. 152,871
In Denmark April 2, 1949

11 Claims. (Cl. 172—126)

This invention relates to apparatus, a part of which is reciprocated or vibrated during operation, examples of such apparatus being a reciprocating conveying trough or feeder, a vibrating screen, etc. More particularly, the invention is concerned with novel means for actuating the reciprocatory or vibratory parts of apparatus of the type described. The new actuating means is not subject to any considerable amount of wear and it is not liable to damage from shocks, so that it requires little attention in use and is of long life.

In such apparatus as a conveyor, in which conveying is accomplished by reciprocating movement of a trough carrying the material to be conveyed, it has been the common practice heretofore to reciprocate the trough by means of an electromagnetic vibration generator, which includes an electromagnet and an armature connected to the trough. The electromagnet of such a generator is supplied with alternating current and the armature is acted on by springs tending to hold it at a fixed distance from the electromagnet, the armature then oscillating at a rate depending on the frequency of the current supply. If desired, the armature of such a generator may be polarised by being permanently magnetized or by being equipped with a direct current winding, in which event the rate of oscillation of the armature is half the frequency of the current. Regardless of the manner of operation of such generators, they are subject to the objection that the armature may strike the magnet, so that the reciprocation of the conveying trough becomes irregular and the generator is liable to damage by shocks. Also, when a change is made in the material being conveyed, it is frequently necessary to change the position of the armature in relation to the magnet and this changes the tension of the springs and alters the natural frequency of the oscillating assembly, so that the nature of the oscillations is modified.

To overcome the objections to the electromagnetic type of generator, use may be made of an electric vibration generator, which includes a stator and an armature mounted within the stator for oscillating movement on the common axis of the stator and armature. In such a generator, the stator is provided with windings supplied with alternating and direct current, respectively, and the armature may then comprise a squirrel cage made up of copper bars extending between copper end rings. Alternatively, the stator may have windings supplied with alternating current and the rotor may have windings supplied with direct current, or the current supplies may be reversed. Also, the direct current windings in either stator or rotor may be replaced by magnets. Such vibration generators having an oscillating armature afford numerous advantages over electromagnetic generators, but transformation of the oscillating movement of the armature into reciprocatory movement of the driven element, such as a conveyor trough, presents various difficulties. Heretofore, linked connections have been used for the purpose, but such connections are subject to rapid wear and damage, because of the forces applied to them.

The present invention is, accordingly, directed to the provision of a novel driving means for imparting reciprocating movement to such an element as a conveying trough, which is free of the objectionable features of the prior constructions. The new driving means includes a vibration generator having an oscillating armature and a unitary flexible connection rigidly attached at one end to the armature and, at the other end, to the driven element. The movements of the armature may be cushioned by springs acting on arms attached to the armature shaft or the shaft may be connected to or formed as a torsion bar. When the shaft is a torsion bar, it may be mounted rigidly, so that no bearings are required.

For a better understanding of the invention, reference may be made to the accompanying drawing, in which Fig. 1 is a view in side elevation, with parts removed, of one form of the new driving means connected to a conveyor trough;

Fig. 2 is a view in side elevation of another form of the driving means;

Fig. 3 is a view in end elevation, with parts broken away, of the driving means shown in Fig. 2;

Figs. 4, 5, and 6 are diagrammatic views similar to Fig. 3 and showing alternative constructions;

Figs. 7 and 8 are views in side elevation of modified forms of the driving means; and Fig. 9 is a wiring diagram of the vibration generator.

In Fig. 1, there is illustrated a portion of a conveyor comprising a trough 10 mounted on the upper ends of laminated springs 11, the lower ends of which are attached to a base 12. Material deposited on the trough is advanced along it, when the trough is reciprocated, and the movement of the trough is effected by means of an electric vibration generator 13 having a stator 14 and an armature 15. The ends 15a of the armature project beyond the stator and a member 16 is bolted at one end to one end of the armature and, at the other, to a block 17 secured to the conveyor trough. The connecting member is rigid endwise and flexible transversely and it may take the form of a laminated spring.

The armature of the vibration generator may be mounted in various ways and, in the construction shown in Figs. 2 and 3, the armature 18 is provided with a shaft 19, the ends of which are squared and received in square openings in standards 20. A bracket 21 is secured to the end of the armature and a connecting member 22, similar to member 16, is rigidly secured at one end to the bracket. With this construction, the shaft 19 serves as a torsion bar to provide counter-torque opposing the movement of the armature in either direction from a neutral position.

The construction shown in Fig. 4 is similar to that of Fig. 3, except that the shaft 23 of armature 24 has one end only formed as a torsion bar 25. The torsion bar end of the shaft has a squared end received in a square opening in a standard 26 and the other end of the shaft is mounted in a bearing 27 in a standard 28. The connecting member 29 is similar to member 16 and one end is rigidly secured to a bracket 30 attached to the end of armature 24. The other end of the connecting member is adapted to be rigidly secured to the element to be vibrated.

In the construction shown in Fig. 5, both ends of the shaft 31 of the armature 32 of the vibration generator 33 are formed as torsion bars, the ends of the shaft being squared and received in square openings in standards 34. The shaft is so long that it is necessary to support it adjacent the generator in bearings 35, the bearings being mounted in standards 36. The connecting member 37, which is similar to member 16, is rigidly secured at one end to a bracket 38 secured to the end of the armature and the other end of the member is adapted to be rigidly secured to the part to be vibrated.

In the Fig. 6 construction, the shaft 39 of the armature 40 of the vibration generator 41 is mounted for oscillation in bearings 42 in standards 43. One end of the shaft is connected by a coupling 44 to one end of a torsion bar 45 having a squared end received in a square opening in a standard 46. The connecting member 47 is similar to member 16 and is rigidly secured at one end to the coupling, while its other end is adapted to be similarly secured to the part to be vibrated.

In the construction shown in Fig. 7, a pair of radial arms 47a are mounted on the shaft 48 of the armature 49 of the vibration generator 50 and the ends of the arms bear against springs 51 carried by suitable supports 52. The connecting member 53, similar to member 16, is bolted at one end to the armature 49 and its other end is bolted to a block 54 secured to the conveyor trough 55 or other part to be vibrated. The arms 47 and springs 51 provide counter-torque opposing the movements of the armature in either direction from a neutral position. A somewhat similar arrangement is shown in Fig. 8, in which arms 47' have ends turned at right angles and bearing against leaf springs 56 secured at one end to blocks 57.

The windings and circuits of one form of vibration generator suitable for use as part of the driving means of the invention are shown diagrammatically in Fig. 9, in which the thick lines indicate the ends of the coils of the windings of the stator 58, the thin lines indicate the connections between the coils, and the dotted lines indicate the supply lines. The small circles represent slots and a cross within such a circle indicates that the currents in the conductors in that slot are flowing away from the observer, while a dot in a small circle indicates current flow toward the observer. The armature 59 is of the squirrel cage type and provided with a plurality of bars extending between end rings. When current from the alternating and direct sources is supplied to the stator windings, currents are induced in the rotor forming magnetic poles and the rotor is subjected to a torque under the influence of the magnetic field created by the direct current in the stator. As the alternating current reverses direction, the currents induced in the rotor will be reversed and poles of opposite magnetic polarity will develop in the rotor, so that the rotor will be subjected to a torque in the opposite direction. The rotor is thus rotated first in one direction and then in the other.

The new driving means is not subject to the disadvantages of the electromagnetic type of vibrator, in that the air gap between the rotor and the stator remain constant and there is no possibility of the rotor striking the stator. The connection between the rotor and the part to be vibrated or reciprocated is provided by a unitary member rigidly attached to the rotor and to the part, so that the connection is not subject to wear or liable to be damaged during use. By providing counter-torque by means of springs or by forming the armature shaft as a torsion bar, the natural frequency of oscillation of the shaft and the other moving parts including the vibrating mass may be equal to or not greatly different from the frequency of oscillation of the armature produced by the electromagnetic forces applied thereto. Under these conditions, the part may be vibrated at a minimum of power consumption.

I claim:

1. Driving means for imparting reciprocatory movement to a driven element, which comprises an electric vibration generator having an oscillating armature, a laminated leaf spring extending laterally from the armature and having one end rigidly secured to the armature with a wide side of said end lying substantially tangent to a circle concentric with the axis of the armature, the plane, in which the spring is flexible, lying at right angles to said axis, means for securing the other end of the spring rigidly to the element, and resilient means opposing the movement of the armature in either direction from a neutral position.

2. Driving means for imparting reciprocatory movement to a driven element, which comprises an electric vibration generator having an oscillating armature, a unitary member rigidly secured at one end to the armature, the member being rigid endwise and flexible transversely, means for securing the other end of the member rigidly to the element, a pair of radial arms attached to the armature, and springs acting on the arms to resist the movement thereof.

3. Driving means for imparting reciprocatory movement to a driven element, which comprises an electric vibration generator including an armature provided with an axial shaft, a torsion bar connected to the shaft, means for holding the free end of the torsion bar against rotation, a unitary member rigidly secured at one end to the armature, the member being rigid endwise and flexible transversely in a plane at right angles to the axis of the torsion bar, and means for securing the other end of the member rigidly to the element.

4. Driving means for imparting reciprocatory movement to a driven element, which comprises an electric vibration generator including an armature provided with an axial shaft, a torsion bar, means for holding one end of the torsion bar against rotation, a coupling connecting the other end of the torsion bar to one end of the shaft, a unitary member rigidly secured at one end to the coupling, the member being rigid endwise and flexible transversely in a plane at right angles to the axis of the torsion bar, and means for securing the other end of the member rigidly to the element.

5. Driving means for imparting reciprocatory movement to a driven element, which comprises an electric vibration generator including an armature provided with an axial shaft, at least one end of the shaft being formed as a torsion bar, means for holding the outer end of the torsion bar against rotation, a support for the other end of the shaft, a unitary member rigidly secured at one end to the armature, the member being rigid endwise and flexible transversely in a plane at right angles to the axis of the shaft, and means for securing the other end of the member rigidly to the element.

6. Driving means for imparting reciprocatory movement to a driven element, which comprises an electric vibration generator including an armature provided with an axial shaft, the ends of the shaft being formed as torsion bars, means for holding the outer ends of the torsion bars against rotation, a unitary member rigidly secured at one end to the armature, the member being rigid endwise and flexible transversely in a plane at right angles to the axis of the shaft, and means for securing the other end of the member rigidly to the element.

7. Driving means for imparting reciprocatory movement to a driven element, which comprises an electric vibration generator including an armature provided with an axial shaft, the ends of the shaft being formed as torsion bars, means for holding the outer ends of the torsion bars against rotation, said means providing the sole support for the shaft and armature, a unitary member rigidly secured at one end to the armature, the member being rigid endwise and flexible transversely in a plane at right angles to the axis of the shaft.

8. Driving means for imparting reciprocatory movement to a driven element, which comprises an electric vibration generator having an oscillating armature, a unitary member rigid endwise and flexible transversely in a single plane, the member extending laterally from the armature and having one end rigidly secured to the armature with said end lying substantially tangent to a circle concentric with the axis of the armature and with the plane, in which the member is flexible, lying at right angles to said axis, means for securing the other end of the member to the element, and resilient means opposing the movement of the armature in either direction from a neutral position.

9. Driving means for imparting reciprocatory movement to a driven element, which comprises an electric vibration generator including an oscillating armature having an axial shaft, at least one end of the shaft being formed as a torsion bar, means for holding the outer end of the torsion bar against rotation, a support for the other end of the shaft, a leaf spring extending laterally from the armature and having one end rigidly secured to the armature with a wide side of said end lying substantially tangent to a circle concentric with the shaft and the spring being flexible in a plane at right angles to the axis of the shaft, and means for securing the other end of the spring to the element.

10. Driving means for imparting reciprocatory movement to a driven element, which comprises an electric vibration generator including a stator and an oscillating armature disposed within and projecting out of the stator, the armature having an axial shaft, at least one end of the shaft being formed as a torsion bar, means for holding the outer end of the torsion bar against rotation, a support for the other end of the shaft, a leaf spring extending laterally from the armature and having one end rigidly secured to a part of the armature projecting from the stator, the wide side of said end lying substantially tangent to a circle concentric with the shaft and with the spring flexible in a plane at right angles to the axis of said shaft, and means for securing the other end of the spring rigidly to the element.

11. Driving means for imparting reciprocatory movement to a driven element, which comprises an electric vibration generator including an oscillating armature having an axial shaft, at least one end of the shaft being formed as a torsion bar, means for holding the outer end of the torsion bar against rotation, a support for the other end of the shaft, a leaf spring extending laterally from the armature and lying substantially in a plane, the spring having one end rigidly secured to the armature with a wide side of said end lying substantially tangent to a circle concentric with the shaft, the spring being flexible in a plane at right angles to the axis of said shaft, and means for securing the other end of the spring to the element.

JOAKIM ULRIK FREDERIK ANDERSEN.

REFERENCES CITED

The following references are of record in the file of this patent:

UNITED STATES PATENTS

| Number | Name | Date |
| --- | --- | --- |
| 1,202,446 | Speed | Oct. 24, 1916 |
| 1,708,315 | Lutes | Apr. 9, 1929 |
| 1,767,104 | Volkman | June 24, 1930 |
| 1,816,102 | Waters | July 28, 1931 |
| 2,413,340 | Swallow | Dec. 31, 1946 |
| 2,499,632 | Coake | Mar. 7, 1950 |

FOREIGN PATENTS

| Number | Country | Date |
| --- | --- | --- |
| 498,041 | Great Britain | Jan. 3, 1939 |
| 662,161 | Germany | July 18, 1938 |